(12) United States Patent
Tao et al.

(10) Patent No.: US 12,107,655 B2
(45) Date of Patent: *Oct. 1, 2024

(54) RESOURCE ALLOCATION FOR BEAM FAILURE RECOVERY PROCEDURE

(71) Applicant: Panasonic Intellectual Property Corporation of America, Torrance, CA (US)

(72) Inventors: Ming-Hung Tao, Langen (DE); Hidetoshi Suzuki, Kanagawa (JP); Quan Kuang, Frankfurt (DE); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/732,291

(22) Filed: Apr. 28, 2022

(65) Prior Publication Data

US 2022/0255614 A1    Aug. 11, 2022

Related U.S. Application Data

(63) Continuation of application No. 16/830,799, filed on Mar. 26, 2020, now Pat. No. 11,349,547, which is a
(Continued)

(30) Foreign Application Priority Data

Sep. 28, 2017   (EP) ..................................... 17193906

(51) Int. Cl.
*H04W 72/23* (2023.01)
*H04B 7/06* (2006.01)
(Continued)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC ..... H04W 76/27; H04W 76/19; H04W 80/02; H04W 72/0446; H04W 74/0833;
(Continued)

(56) References Cited

U.S. PATENT DOCUMENTS

| | | | |
|---|---|---|---|
| 9,572,063 B2 * | 2/2017 | Etemad ................ | H04W 24/04 |
| 10,917,825 B2 | 2/2021 | Peisa et al. | |
| 11,245,456 B2 | 2/2022 | Marinier et al. | |
| 2012/0250523 A1 | 10/2012 | Miki | |
| 2017/0026962 A1 | 1/2017 | Liu et al. | |

(Continued)

FOREIGN PATENT DOCUMENTS

| | | |
|---|---|---|
| EP | 1 113 686 A2 | 7/2001 |
| RU | 2433571 C2 | 11/2011 |

(Continued)

OTHER PUBLICATIONS

LG Electronics, "Discussion on beam failure recovery," R1-1710283, Agenda Item: 5.1.2.2.2, 3GPP TSG RAN WG1 NR Ad-Hoc#2, Qingdao, P.R. China, Jun. 27-30, 2017. (7 pages).

(Continued)

*Primary Examiner* — Wei Zhao
(74) *Attorney, Agent, or Firm* — Seed IP Law Group LLP

(57) ABSTRACT

The present disclosure relates to a mobile terminal, a base station, an operating method for a mobile terminal and an operating method for a base station. The mobile terminal is for communicating in a mobile communication system with a base station using at least one of a plurality of downlink beams and at least one of a plurality of uplink beams, each of the downlink and uplink beams having different directivities and/or coverage, comprising: which, in operation, (Continued)

receives for a beam failure recovery, BFR, procedure an allocation of dedicated uplink radio resources for transmitting a beam failure recovery signal, a processor which, in operation, detects a downlink beam failure event and, in response thereto, initiates the beam failure recovery procedure, including the transceiver transmitting the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

13 Claims, 7 Drawing Sheets

Related U.S. Application Data continuation of application No. PCT/EP2018/075517, filed on Sep. 20, 2018.

(51) Int. Cl.

| | |
|---|---|
| H04L 5/00 | (2006.01) |
| H04L 5/10 | (2006.01) |
| H04W 74/0833 | (2024.01) |
| H04W 76/19 | (2018.01) |
| H04W 76/27 | (2018.01) |
| H04W 80/02 | (2009.01) |

(52) U.S. Cl.
CPC .............. *H04L 5/0051* (2013.01); *H04L 5/10* (2013.01); *H04W 72/23* (2023.01); *H04W 74/0833* (2013.01); *H04W 76/19* (2018.02); *H04W 76/27* (2018.02); *H04W 80/02* (2013.01)

(58) Field of Classification Search
CPC ................ H04B 7/0695; H04B 7/0617; H04B 7/0626; H04L 5/10; H04L 5/0051
See application file for complete search history.

(56) References Cited

U.S. PATENT DOCUMENTS

| | | | |
|---|---|---|---|
| 2018/0176801 | A1* | 6/2018 | Rune .................... H04W 24/08 |
| 2018/0206170 | A1* | 7/2018 | Nagaraja ............... H04W 16/28 |
| 2018/0227899 | A1 | 8/2018 | Yu et al. |
| 2020/0022126 | A1* | 1/2020 | You .................... H04W 74/0833 |
| 2020/0068644 | A1 | 2/2020 | Zhou et al. |
| 2020/0154326 | A1 | 5/2020 | Deenoo et al. |
| 2020/0374960 | A1 | 11/2020 | Deenoo et al. |

FOREIGN PATENT DOCUMENTS

| | | |
|---|---|---|
| RU | 2479154 C2 | 4/2013 |
| WO | 2004/039011 A2 | 5/2004 |
| WO | WO 2016028125 A2 | 2/2016 |
| WO | WO 2017023621 A1 | 2/2017 |
| WO | WO 2017151876 A1 | 9/2017 |
| WO | WO 2019039989 A1 | 2/2019 |

OTHER PUBLICATIONS

3GPP, "3rd Generation Partnership Project; Technical Specification Group Radio Access Network; NR; Radio Resource Control (RRC) protocol specification; (Release 15)," 3GPP TS 38.331 V15.2.0, Jun. 2018. (304 pages).
InterDigital, Inc., "Correction to beam failure recovery timer," R2-1808176, 3GPP TSG-RAN WG2 Meeting #102, Busan, Republic of Korea, May 21-25, 2018. (3 pages).
InterDigital, Inc., "On Remaining Details of Beam Failure Recovery," R1-1710926, Agenda Item: 5.1.2.2.2, 3GPP TSG RAN WG1 NR Ad-Hoc#2, Qingdao, P.R. China, Jun. 27-30, 2017. (5 pages).
InterDigital, Inc., "On Remaining Issues of Synchronization Signal," R1-1716457, Agenda Item: 6.1.1, 3GPP TSG RAN WG1 Meeting NR#3, Nagoya, Japan, Sep. 18-21, 2017. (4 pages).
InterDigital, Inc., "Remaining issues on beam failure recovery," R1-1804846, Agenda Item: 7.1.2.2.4, 3GPP TSG RAN WG1 Meeting #92bis, Sanya, China, Apr. 16-20, 2018. (3 pages).
Lenovo, Motorola Mobility, "Resource configuration for beam failure recovery request," R2-1706905, Agenda item: 10.2.10, 3GPP TSG-RAN WG2 Meeting#AH, Qingdao, China, Jun. 27-29, 2017. (4 pages).
MediaTek Inc., "Summary 2 on Remaining issues on Beam Failure Recovery," R1-1805689, Agenda Item: 7.1.2.2.4, 3GPP TSG RAN WG1 Meeting #92bis, Sanya, China, Apr. 16-20, 2018. (21 pages).
MediaTek, "Summary on Beam Recovery Mechanism," R1-1716767, Agenda item: 6.2.2.4, 3GPP TSG RAN WG1 Meeting NR AH#3, Nagoya, Japan, Sep. 18-21, 2017. (23 pages).
Panasonic, "UL resource configuration for the beam failure recovery," R2-1712407, Agenda Item: 10.2.13, 3GPP TSG-RAN WG2 #100, Reno, Nevada, USA, Nov. 21-Dec. 1, 2017. (3 pages).
Qualcomm Incorporated, "Identified inconsistencies between RAN1 and RAN2 decisions on beam management," RP-180475, Agenda item: 9.2.1, 3GPP RAN #79, Chennai, India, Mar. 19-22, 2018. (3 pages).
Qualcomm Incorporated, "PRACH Procedure Considerations," R1-1716384, Agenda item: 6.1.4.2, 3GPP TSG-RAN WG1 Meeting NR#3, Nagoya, Japan, Sep. 18-21, 2017. (16 pages).
English Translation of Japanese Office Action, issued Jul. 12, 2022, for Japanese Patent Application No. 2020-517461. (8 pages).
Vivo, "Beam failure recovery procedure," R1-1710400, Agenda Item: 5.1.2.2.2, 3GPP TSG RAN WG1 Meeting NR Ad-Hoc#2, Qingdao, P. R. China, Jun. 27-30, 2017. (5 pages).
3GPP TR 38.801 V2.0.0, "3$^{rd}$ Generation Partnership Project; Technical Specification Group Radio Access Network; Study on New Radio Access Technology; Radio Access Architecture and Interfaces (Release 14)," Mar. 2017, 90 pages.
3GPP TR 38.802 V2.0.0, "3$^{rd}$ Generation Partnership Project; Technical Specification Group Radio Access Network; Study on New Radio (NR) Access Technology; Physical Layer Aspects (Release 14)," Mar. 2017, 134 pages.
3GPP TR 38.913 V14.1.0, "3$^{rd}$ Generation Partnership Project; Technical Specification Group Radio Access Network; Study on Scenarios and Requirements for Next Generation Access Technologies; (Release 14)," Dec. 2016, 38 pages.
CATT, "Beam failure detection and recovery," R1-1712379, Agenda Item: 6.1.2.2.7, 3GPP TSG RAN WG1 #90, Prague, Czech Republic, Aug. 21-25, 2017, 4 pages.
Extended European Search Report, dated Jun. 1, 2018, for European Application No. 17193906.9-1220, 24 pages.
Huawei, HiSilicon, "Beam failure recovery," R1-1708135, Agenda Item: 7.1.2.2.2, 3GPP TSG RAN WG1 Meeting #89, Hangzhou, China, May 15-19, 2017, 10 pages.
International Search Report, mailed Feb. 18, 2019, for International Application No. PCT/EP2018/075517, 5 pages.
Nokia, Nokia Shanghai Bell, "Beam Recovery in NR," R1-1716500, Agenda item 6.2.2.4, 3GPP TSG RAN WG1 Meeting NR#3, Nagoya, Japan, Sep. 18-21, 2017, 8 pages.
Russian Office Action, dated Sep. 9, 2021, for Russian Application No. 2020111990/07(020313), 16 pages. (with English translation).

* cited by examiner

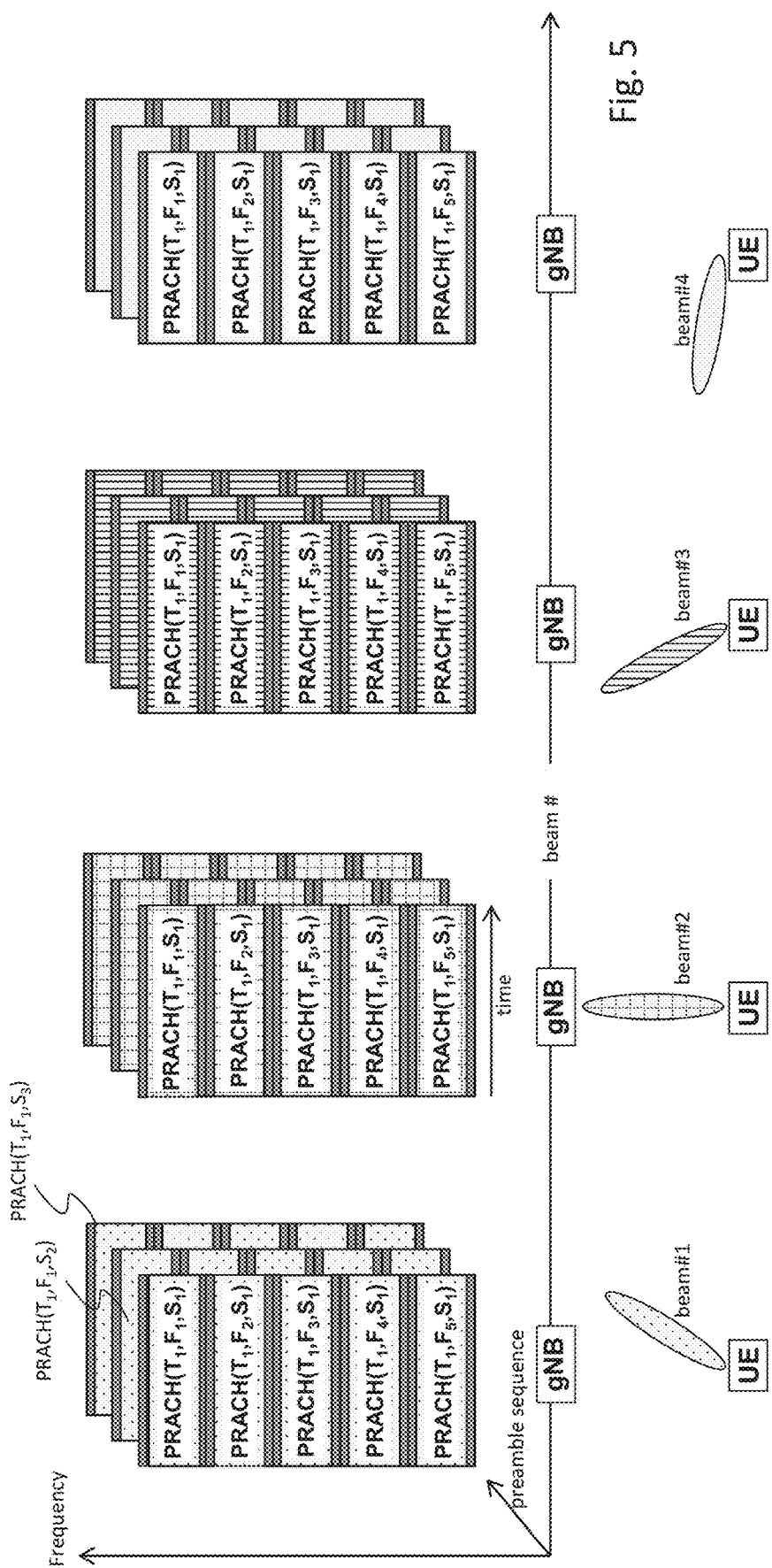

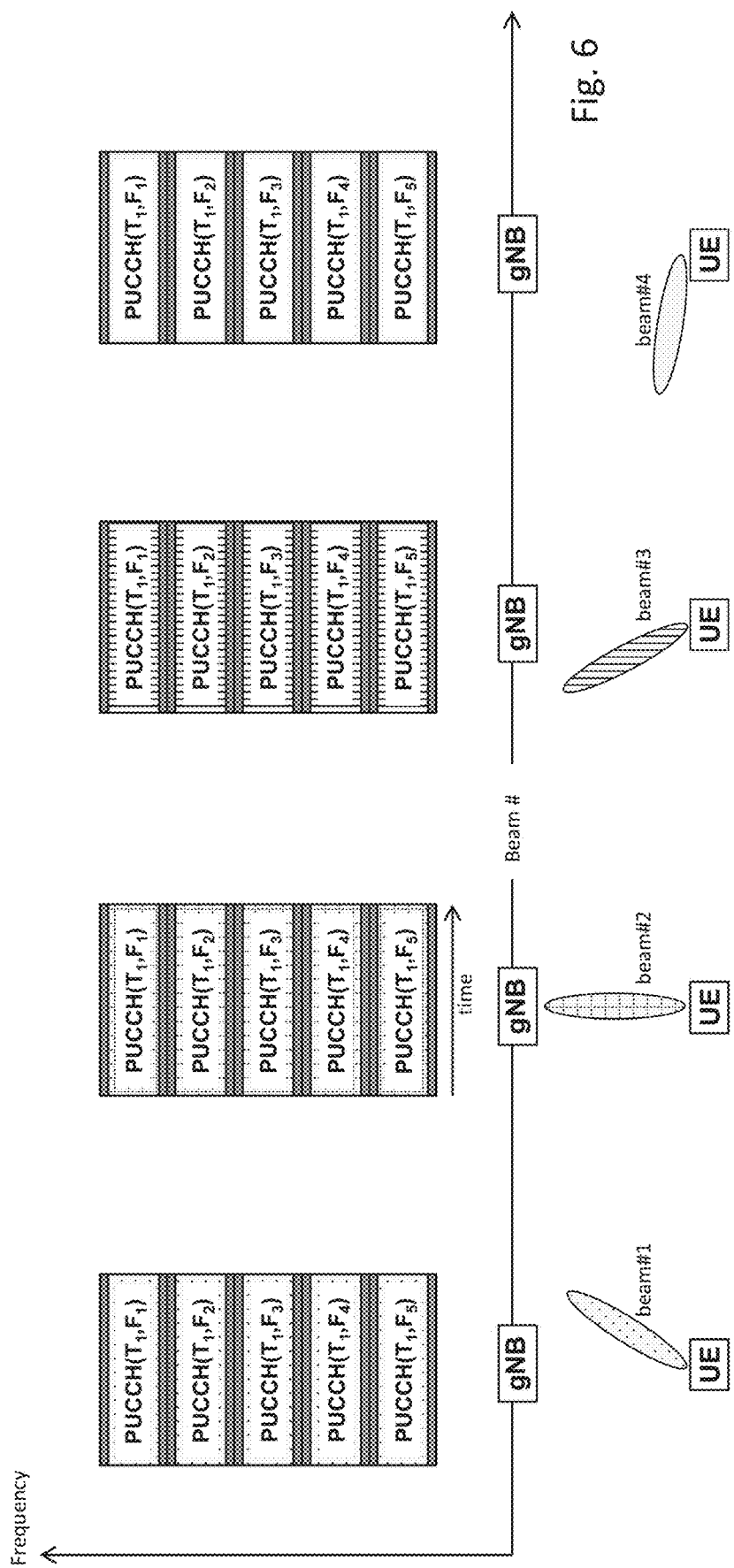

RESOURCE ALLOCATION FOR BEAM FAILURE RECOVERY PROCEDURE

BACKGROUND

Technical Field

The present disclosure relates to an uplink resource allocation for a mobile terminal to transmit a beam failure recovery signal in response to it having detected a downlink beam failure event when communicating in a mobile communication system with a base station.

Description of the Related Art

Currently, the 3$^{rd}$ Generation Partnership Project (3GPP) focuses on the next release (Release 15) of technical specifications for the next generation cellular technology, which is also called fifth generation (5G).

At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item (WI) which will define the first 5G standard.

One objective of 5G new radio (NR) is to provide a single technical framework addressing all usage scenarios, requirements and deployment scenarios defined in 3GPP TSG RAN TR 38.913 v14.1.0, "*Study on Scenarios and Requirements for Next Generation Access Technologies*", December 2016 (available at www.3gpp.org and incorporated herein in its entirety by reference), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility, anticipating future use cases/deployment scenarios. The backward compatibility to Long Term Evolution (LTE) is not required, which facilitates a completely new system design and/or the introduction of novel features.

As summarized in one of the technical reports for the NR study item (3GPP TSG TR 38.801 v2.0.0, "*Study on New Radio Access Technology; Radio Access Architecture and Interfaces*", March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

As summarized in another of the technical reports for the NR study item (3GPP TSG TR 38.802 V2.0.0, "*Study on New Radio (NR) Access Technology; Physical Layer Aspects*" a multi-antenna scheme relies on a set of beam management procedures. This procedures enable the transmit receive points (TRPs) and/or the UE to acquire and maintain a set of beams that can be used for DL and UL transmission/reception, including beam determination, beam measurement, beam reporting and beam sweeping.

One of the design targets in NR is to utilize the fundamental physical layer signal waveform in communications while increasing the coverage with base stations supporting single-user and multi-user MIMO in both downlink and uplink. For this purpose, it was agreed in the 3GPP TSG RAN1 WG1 Meeting #89, Hangzhou, P.R. China 15-19 May 2017 to employ beam management procedures including a beam failure recovery mechanism in case a beam failure is detect. This mechanism is separate from radio link failure procedures in upper layers.

The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

BRIEF SUMMARY

One non-limiting and exemplary embodiment facilitates the beam failure recovery procedure to be initiated in a robust (reliable) manner, namely by utilizing dedicated uplink radio resources on a more efficient (situation-dependent) basis.

In one general aspect, the techniques disclosed here feature, a mobile terminal for communicating in a mobile communication system with a base station using at least one of a plurality of downlink beams and at least one of a plurality of uplink beams, each of the downlink and uplink beams having different directivities and/or coverage, comprising: which, in operation, receives for a beam failure recovery, BFR, procedure an allocation of dedicated uplink radio resources for transmitting a beam failure recovery signal, a processor which, in operation, detects a downlink beam failure event and, in response thereto, initiates the beam failure recovery procedure, including the transceiver transmitting the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

It should be noted that general or specific embodiments may be implemented as a system, a method, an integrated circuit, a computer program, a storage medium, or any selective combination thereof.

Additional benefits and advantages of the disclosed embodiments will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 5 is schematically illustrating dedicated uplink radio resources in a physical random access channel, PRACH for initiation of the beam failure recovery procedure;

FIG. 6 is schematically illustrating dedicated uplink radio resources in a physical uplink control channel, PUCCH for initiation of the beam failure recovery procedure.

DETAILED DESCRIPTION

Figure 1:
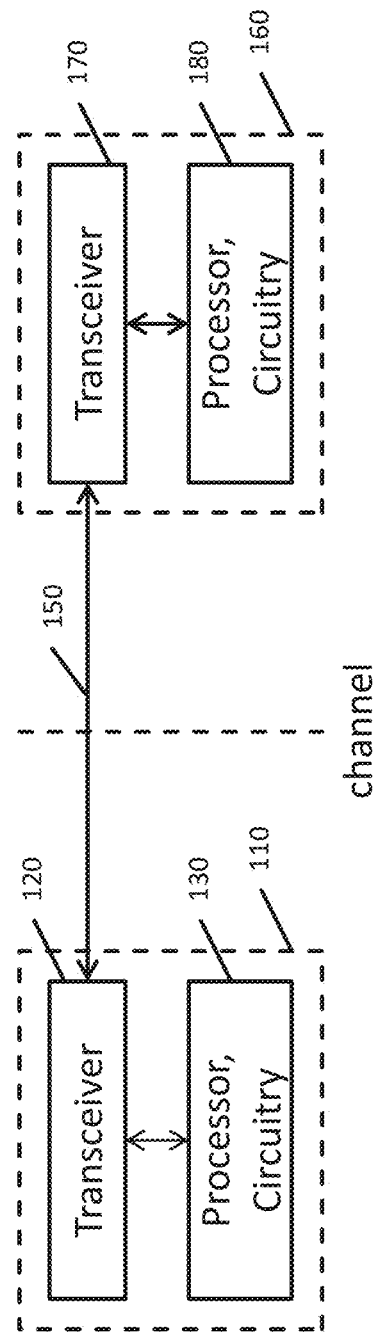
FIG. 1 is a block diagram showing the structure of a mobile terminal and a base station.

In another general aspect, the techniques disclosed here feature, another mobile terminal for communicating in a mobile communication system with a base station using at least one of a plurality of downlink beams and at least one of a plurality of uplink beams, each of the downlink and uplink beams having different directivities, comprising: which, in operation, receives for a beam failure recovery, BFR, procedure an allocation of dedicated uplink radio resources for transmitting a beam failure recovery signal, a processor which, in operation, detects a downlink beam failure event and, in response thereto, initiates the beam failure recovery procedure, including the transceiver transmitting the beam failure recovery signal using the dedicated uplink radio resources of the previous allocation; wherein the dedicated uplink radio resources are restricting the transmission to a subset of the plurality of uplink beams that can be non-exclusively allocated by the base station to the mobile terminal.

In further general aspect, the techniques disclosed here feature, a method for initiating a beam failure recovery procedure to be performed by a mobile terminal configured to communicate in a mobile communication system with a base station using at least one of a plurality of downlink beams and at least one of a plurality of uplink beams, each of the downlink and uplink beams having different directivities and/or coverage, the method comprising the steps of: receiving for a beam failure recovery, BFR, procedure an allocation of dedicated uplink radio resources for transmitting a beam failure recovery signal, detecting a downlink beam failure event and, in response thereto, initiating the beam failure recovery procedure, including transmitting the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

In yet another general aspect, the techniques disclosed here feature, another method for initiating a beam failure recovery procedure to be performed by a mobile terminal configured to communicate with a base station using at least one of a plurality of downlink beams and at least one of a plurality of uplink beams, each of the uplink and downlink beams having different directivities, comprising: receiving for a beam failure recovery, BFR, procedure an allocation of dedicated uplink radio resources for a beam failure recovery signal, detecting a downlink beam failure event and, in response thereto, initiating the beam failure recovery procedure, including transmitting the beam failure recovery signal using the dedicated uplink radio resources of the previous allocation; wherein the dedicated uplink radio resources are restricting the transmission to a subset of the plurality of uplink beams that can be non-exclusively allocated by the base station to the mobile terminal.

As identified in TR 38.913, the various use cases/deployment scenarios for NR have diverse requirements in terms of data rates, latency, and coverage. With these requirements in mind NR should aim for even higher coverage, as compared with LTE.

In 3GPP RAN1 #85, beam based transmissions have been discussed extensively for NR as a key technology to ensure coverage. It was agreed for beam management that both intra-TRP and inter-TRP beamforming procedures are considered, and beamforming procedures are considered with/without TRP beamforming/beam sweeping and with/without UE beamforming/beam sweeping, according to the following potential use cases: UE movement, UE rotation, beam blocking (change of beam at TRP, same beam at UE; same beam at TRP, change of beam at UE; or change of beam at TRP, change of beam at UE) where other cases are not precluded. It was further agreed to study beam (e.g., TRP beam(s) and/or UE beam(s)) management procedure (e.g., beam determination and change procedure) with/without prior acquired beam(s) information, namely for both data and control transmission/receptions, where the procedures may or may not be the same for data and control.

Subsequently, in RAN1 #88, the following agreements were reached: Beam failure event occurs when the quality of beam pair link(s) of an associated control channel falls low enough (e.g., comparison with a threshold, time-out of an associated timer). Mechanism to recover from beam failure is triggered when beam failure occurs. Note: the beam pair link is used for convenience, and may or may not be used in specification. It remained for further study, FFS: whether quality can additionally include quality of beam pair link(s) associated with NR-PDSCH; when multiple Y beam pair links are configured, X (<=Y) out of Y beam pair links falls below certain threshold fulfilling beam failure condition may declare beam failure; search space (UE-specific vs. common) of the associated NR-PDCCH; what the signaling mechanisms for NR-PDCCH are in the case of UE is configured to monitor multiple beam pair links for NR-PDCCH. Further, the exact definition of such threshold is FFS and other conditions for triggering such mechanism are not precluded.

It was also agreed that the following signals can be configured for detecting beam failure by UE and for identifying new potential beams by UE, yet remaining FFS the reference to the signals, e.g., RS for beam management, RS for fine timing/frequency tracking, SS blocks, DM-RS of PDCCH (including group common PDCCH and/or UE specific PDCCH), DM-RS of PDSCH. If beam failure event occurs and no new potential beams were detected by the UE in the serving cell, it has remained for FFS whether or not the UE provides an indication to L3, and whether or not the indication links to the radio link failure event. Note: the criterion for declaring radio link failure is for RAN2 to decide. Also for FFS is the necessity of such indication. NR supports configuring resources for sending request for recovery purposes in symbols containing RACH and/or FFS scheduling request or in other indicated symbols.

Then, in RAN1 #88Bis it was agreed that UE beam failure recovery mechanism includes the following aspects: beam failure detection; new candidate beam identification; beam failure recovery request transmission; where the UE monitors gNB response for beam failure recovery request. In beam failure detection, UE monitors beam failure detection RS to assess if a beam failure trigger condition has been met; where beam failure detection RS at least includes periodic CSI-RS for beam management; and where sounding signal, SS-block within the serving cell can be considered, if SS-block is also used in beam management as well. It has however been left FFS what Trigger condition are for declaring beam failure.

Regarding the new candidate beam identification it was also agreed that UE monitors beam identification RS to find a new candidate beam; and the beam identification RS includes Periodic CSI-RS for beam management, if it is configured by NW; and/or periodic CSI-RS and SS-blocks within the serving cell, if SS-block is also used in beam management as well Regarding the beam failure recovery request transmission was also agreed that the information carried by beam failure recovery request includes at least one followings: explicit/implicit information about identifying UE and new gNB TX beam information; explicit/implicit information about identifying UE and whether or not new candidate beam exists. The following was left FFS: information indicating UE beam failure; additional information, e.g., new beam quality. A down-selection between the following channels for beam failure recovery request transmission was agreed to include PRACH; PUCCH; PRACH-like (e.g., different parameter for preamble sequence from PRACH). Beam failure recovery request resource/signal may be additionally used for scheduling request.

In this regard, the UE monitors a control channel search space to receive gNB response for beam failure recovery request, where it is FFS: if the control channel search space can be same or different from the current control channel search space associated with serving BPLs, and/or what the UEs further reaction are if gNB does not receive beam failure recovery request transmission.

Thus, it may be concluded that beam failure recovery procedure discussed above facilitates an efficient way to re-establish a connection between the UE and the gNB (i.e., TRP) after a downlink beam failure event, namely without the necessity of declaring a radio link failure to higher layers. Nevertheless it was recognized that this beam failure recovery procedure can only be successful if it provides measures which allow the UE to act quickly before the radio link failure event has been triggered.

In other words, the concept of recovering after a beam failure builds on the procedure that the UE, after detecting a beam failure for the downlink beam, indicates to the gNB an alternative (i.e., candidate) downlink beam over which the communication between the gNB and the UE can be recovered. Hence, the procedure relies on the UE being still capable of indicating to the gNB alternative (i.e., candidate) downlink beams. This, however, is only possible for a short period of time after the downlink beam failure has occurred.

Consequently, one non-limiting exemplary embodiment of the present disclosure suggests a robust mechanism that will enable the UE to respond to the beam failure detection event by initiating the beam failure recovery procedure as quickly as possible in order to avoid any deteriorating-effects which are resulting from the inherent correspondence between downlink beam and the uplink beam.

The suggested robust mechanism can even better be understood when turning to the origin or cause for the beam failures in the communication between the gNB and the UE. This understanding is generally based on, however not restricted to, a deployment scenario of 3GPP NR, namely where the concept of beams is introduced to improve directivity and/or coverage. This is particularly advantageous in view of the envisioned very high frequency bands (millimeter wave) in which 3GPP NR is intended to operate.

Figure 7B:
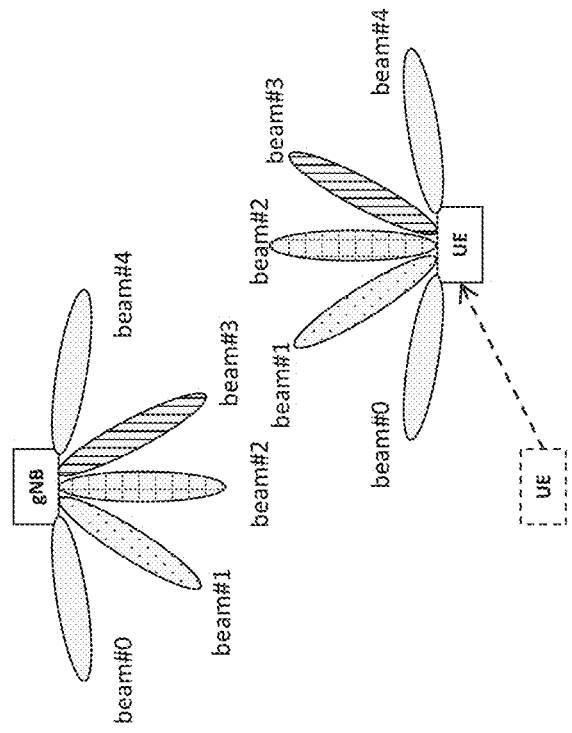
FIGS. 7a-7b are schematic drawings illustrating main causes of a downlink beam failure in a 3GPP NR deployment scenario.
Figure 7A:
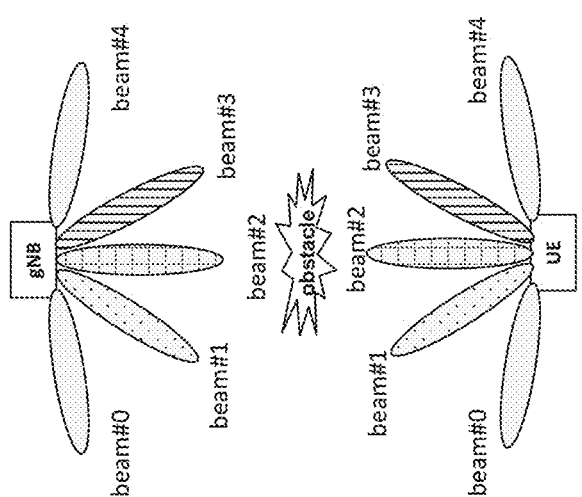

As shown in FIGS. 7a and 7b, a gNB can be configured to communicate on multiple beams (e.g., beam #0 to beam #4). This is necessary for the initial access by the UE. After having established a connection between the gNB and the UE, the gNB serves the UE with a downlink on a single beam (termed "downlink serving beam" or "downlink beam"). Having said this, it shall be appreciated that multiple-beam scenarios can also be envisioned, namely where the gNB serves the UE with a downlink via two or more separate beams, for instance to increase capacity.

Similarly, the UE can be configured to communicate on multiple beams (e.g., beam #0 to beam #4). This is equally necessary for the initial access by the UE. After having established the connection, the UE is sending uplink traffic to the gNB with an uplink also on a single beam (termed "uplink serving beam" or "uplink beam"). This single uplink serving beam is, however, not necessarily the same as the beam on which the downlink is served. Also in the uplink, multiple-beam scenarios can be envisioned such that the disclosure shall not be construed as being limited in any respect.

In general, it can be assumed that the pair(s) of downlink and uplink serving beams has suitable properties for the downlink and uplink communication between the gNB and the UE. In many cases, it can be readily understood that there is a correspondence in directivity between the pair(s) of downlink serving beam and uplink serving beam, namely that the pair of downlink and uplink serving beams are beams having opposite directions and similar coverage.

In this context it shall be mentioned that a gNB in 3GPP NR is configured with one or multiple TRP (Transmit/Receive Points or Tx/Rx Points), each TRP being linked to a downlink and/or uplink serving beam with a specific direction and a specific coverage. Thus, for a multi-beam configuration, the gNB would necessarily be configured with more than one TRP, namely to be capable of transmitting/receiving beams with different directions and/or coverage.

Coming back to the origin or cause for the beam failure, it can be immediately derived from the figures that one main cause of beam failures (cf. FIG. 7a) is an obstacle which inhibits a propagation of the serving beam(s) between the gNB and the UE and vice-versa. Another main cause of beam failures (cf. FIG. 7b) is a movement of the UE with respect to the gNB, thereby resulting in the beams propagating in inappropriate directions.

With this understanding, it can however be appreciated that both main causes do not necessarily affect the pair(s) of downlink and uplink serving beams in a same fashion. In other words, should the downlink communication be served on a beam with a direction other than that of the beam serving the uplink communication, it may very well be that only one of the downlink and uplink beams is undergoing beam failure.

There may even be cases where, in case of a closer distance between the obstacle and the UE as opposed to the obstacle and the gNB, the uplink serving beam does not undergo beam failure at the close distance, but the downlink serving beam does undergo beam failure at the farther distance.

Hence, it has been readily recognized that there is a need for beam failure recovery procedure, namely in situations when the downlink serving beam undergoes beam failure but the uplink serving beam is still operational. In this situation, a beam failure recovery request may be sent by the UE indicating alternative (i.e., candidate) downlink beams for serving the downlink communication.

The present disclosure provides a robust mechanism that enables the UE to respond to the detection of a downlink beam failure event while reducing the amount of uplink radio resources that are blocked (assigned) for initiating the beam failure recovery procedure. This mechanism is particularly suitable for a proposed scenario in 3GPP NR according to which the beam failure recovery procedure relies on contention-free physical random access channel, PRACH, resources or contention-free physical uplink control channel, PUCCH, resources.

As apparent from this scenario, using a contention-free PRACH or PUCCH resource for the beam failure recovery procedure has advantages as well as drawbacks. Relying on contention-free resources on an uplink beam facilitates an immediate access by the UE to signal to the gNB that the beam failure event has been detected for a downlink beam. However, due to the uncertainty when in time and under what directivity conditions the radio link failure is detected, the UE would have to be allocated with all potentially available combinations for it to successfully initiate the beam failure recovery procedure.

This uncertainty would result in each UE blocking a vast amount of dedicated uplink radio resources, particular in the case of the suggested contention-free physical random access channel, PRACH, resources or contention-free physical uplink control channel, PUCCH, resources. In view of the envisioned large number of UEs that are to be served by each gNB, this results in a large overhead of dedicated uplink radio resources which cannot be used for other purposes. Consequently, the approach clearly conflicts with existing design principles according to which resources (particularly scarce resources) shall be only allocated by the gNB (thus blocked) if they are required and expected to be used in the near future by the UE.

The present disclosure provides solutions to mitigate these drawbacks while still allowing the beam failure recovery procedure to be initiated in a robust (reliable) manner, namely by utilizing dedicated uplink radio resources on a more efficient (situation-dependent) basis.

Generally, the present disclosure provides devices and methods for a utilization of dedicated uplink radio resources to initiate a beam failure recovery procedure not for all potentially available but only for the relevant constellations that are (actually) expected to be encountered should the beam failure event be detected. As the relevant constellations may change over time, the dedicated uplink radio resources can be flexibly (re-)allocated without incurring a large signaling overhead.

For this purpose, it is proposed that the gNB allocates to an UE uplink radio resources, dedicated for the initiation of the beam failure recover procedure, on a restricted but efficient basis, namely by restricting a signaling of a beam failure recovery signal to only a subset of all potentially available uplink beam that can be exclusively or non-exclusively allocated by the gNB to the UE. Having restricted dedicated uplink radio resources to a subset, for example one, two or three uplink beams out of the maximum number of, say ten, potentially available uplink beams, the blockage of same dedicated uplink radio resources is far less compromising to the operation of the wireless communication system.

Notably, this effectively contrasts the alternative approach of a beam failure recovery procedure where the beam failure recovery signal is transmitted in a full beam sweeping manner (i.e., successively utilizing all potentially available uplink beams for the transmission of beam failure recovery signal). For this beam sweeping it would be required to allocate (hence block) dedicated uplink radio resources on all potentially available uplink beams.

Incremental thereto, it is proposed to employ an efficient mechanism for (re-) allocating same dedicated uplink radio resources which can ensure that the gNB allocates to the UE only the most pertinent dedicated uplink radio resources. For each (actual) situation the UE must still be capable of initiating, upon detection of a downlink beam failure event, a beam failure recovery procedure. In this context, it may be advantageous to reduce blockage if the (re-) allocation of the dedicated uplink radio resources expires after a given time period, or if the (re-)allocation of the dedicated uplink radio resources is updated on a periodic basis.

FIG. 1 illustrates a block diagram of the wireless communication system including a mobile terminal 110 and a base station 160 communicating with each other using at least one of a plurality of downlink beams and at least one of a plurality of uplink beams. In other words, the communication between the mobile terminal 110 and the base station 160 is taking place on a pair of a downlink and an uplink (serving) beam 150.

In the context of the present disclosure, the term beam is to be construed as having a specific (pre-determined) directivity and/or coverage. Each of the uplink beams as well as each of the downlink beams has a different directivity and/or coverage, thereby resulting in ability for the transmitter to transmit signal to a receiver at different (spatial) positions. In other words, each of the uplink beams as well as each of the downlink beams has different spatial parameters (e.g., gain and/or beam width)

The mobile terminal 110 comprises a transceiver 120 which, in operation, receives from the base station 160 for a beam failure recovery, BFR, procedure an allocation of dedicated uplink radio resources for sending a beam failure recovery signal. Further, the mobile terminal 110 comprises a processor 130 which, in operation, detects a downlink beam failure event and, in response thereto, initiates the beam failure recovery procedure, including the transceiver 120 transmitting to the base station 160 the beam failure recovery signal using the dedicated uplink radio resources from the allocation.

Notably, the dedicated uplink radio resources, allocated to the mobile terminal 110, are restricting the transmission to a subset of the plurality of uplink beams that can be exclusively allocated by the base station 160. Thereby, not all but only the subset of dedicated uplink radio resources is blocked from being used in an exclusive manner by another mobile terminal.

Alternatively, the dedicated uplink radio resources, allocated to the mobile terminal 110, are restricting the transmission to a subset of the plurality of uplink beams that can be non-exclusively allocated by the base station 160. Thereby, also here not all but only the subset of dedicated uplink radio resources is blocked from being used in a non-exclusive manner by another mobile terminal.

In the context of the present disclosure a distinction is made between an exclusive and a non-exclusive allocation of dedicated uplink radio resources on uplink beams. An exclusive allocation shall be construed in a sense such that no other mobile terminal is allocated, for a same time period, with a same dedicated uplink radio resource, including a same uplink beam. In contrast, a non-exclusive allocation shall be construed in the sense such that possibly other mobile terminals are allocated, for a same time period, with the same dedicated uplink radio resource, including a same uplink beam.

The base station 160 comprises a transceiver 170 which, in operation, transmits to the mobile terminal 110 for a beam failure recovery, BFR, procedure an allocation of dedicated uplink radio resources for the mobile terminal 110 to send a beam failure recovery signal. Further, the base station 160 comprises a processor 180 which, in operation, performs the beam failure recovery procedure in response to the transceiver 170 receiving from the mobile terminal 110 the beam failure recovery signal using the dedicated uplink radio resources from the allocation.

Notably, also here the dedicated uplink radio resources, allocated by the base station 160, are restricting the transmission to a subset of the plurality of uplink beams that can be exclusively allocated to the mobile terminal 110. Thereby, not all but only the subset of dedicated uplink radio resources is blocked from being used in an exclusive manner by another mobile terminal.

Alternatively, the dedicated uplink radio resources, allocated by the base station 160, are restricting the transmission to a subset of the plurality of uplink beams that can be non-exclusively allocated to the mobile terminal 110. Thereby, also here not all but only the subset of dedicated uplink radio resources is blocked from being used in a non-exclusive manner by another mobile terminal.

Figure 2:
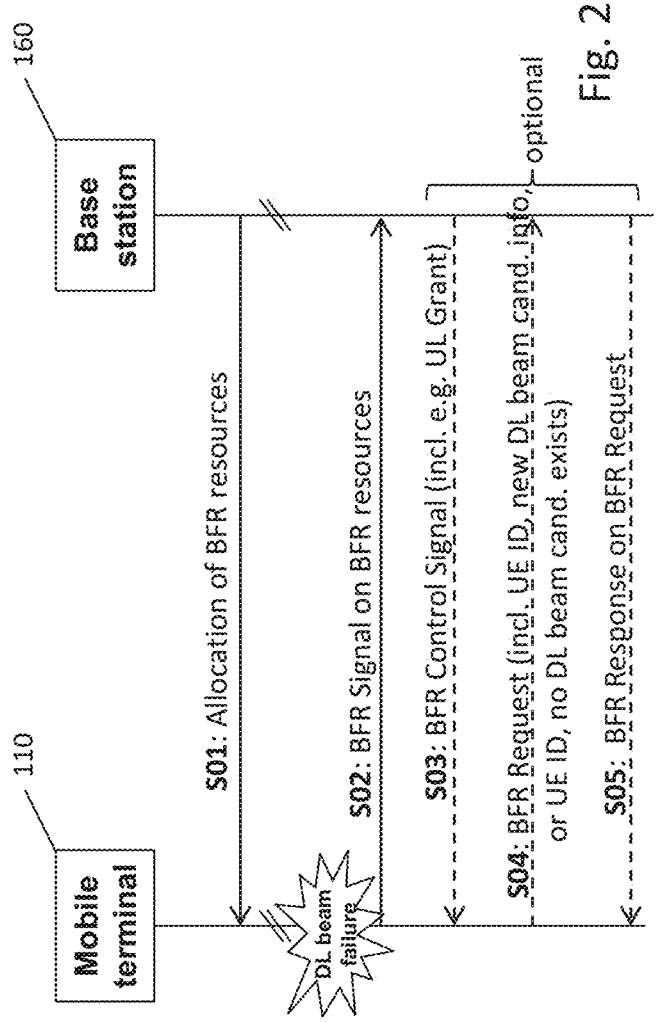
FIG. 2 is schematic drawings illustrating a beam failure recovery procedure initiation in the context of a 4-step beam failure recovery procedure in a general deployment scenario.

The initiation of the beam failure recovery procedure and more particularly the allocation of dedicated uplink radio resources shall be explained in further detail with respect to FIG. 2. In particular, this figure puts the present disclosure into the context of an exemplary 4-step beam failure recovery procedure. Notably, the present disclosure shall not be construed as being limited in any respect.

In FIG. 2, the mobile terminal 110 (also termed UE) and the base station 160 (also termed gNB) are communicating in a wireless communication network using a pair of a downlink and an uplink (serving) beams 150. In particular, the pair of the downlink and uplink beams is one of a plurality of downlink beams and one of a plurality of uplink beams that can be configured by the base station 160 in the mobile terminal 110.

For the beam failure recovery procedure, the mobile terminal 110 is allocated (S01-FIG. 2) by the base station 160 with dedicated uplink radio resources. As mentioned earlier, the allocation of these uplink radio resources is dedicated for use with beam failure recovery signaling. In other words, this dedication of the uplink radio resources can prevent it from being used in a different context. In any case, the dedication of the uplink radio resource enables the base station 160 to identify (recognize) and initiate the associated functionality (i.e., initiate the beam failure recovery procedure) when receiving the beam failure recovery signaling on the dedicated uplink radio resource.

In addition, the allocation of the dedicated uplink radio resources may include an instruction from the base station 160 that for the purposes of the beam failure recovery procedure, the mobile terminal 110 shall include its identification (e.g., a radio network terminal identifier, RNTI) in subsequent messages of the beam failure recovery procedure. This can be particularly advantageous, in case the mobile terminal 110 is not-exclusively but instead non-exclusively allocated the dedicated uplink radio resources, which is however discussed further below.

Subsequently, the mobile terminal 110 detects a downlink (also termed DL) beam failure event, i.e., a beam failure for the downlink (serving) beam of the beam pair 150 over which the base station 160 and the mobile terminal 110 are communicating with each other. Two main causes for beam failures, namely an obstacle and an UE movement, have already been discussed above.

Further, there are numerous ways for the mobile terminal 110 to detect the beam failure event for the downlink (serving) beam, for instance by measuring the reference signal received power, RSRP, or the reference signal received quality, RSRQ, on this (serving) downlink beam and determining that the measurement has fallen below a given threshold. Other ways for the mobile terminal 110 to detect the beam failure event for the downlink (serving) beam may include a lapse of given (countdown) timer, namely when the periodic control and/or user data has not been received within the time period defined by the given (countdown) timer.

In this respect, the beam failure event may be understood as an event which may directly (i.e., by measurements) or indirectly (i.e., by lapse of a timer) be detected in the mobile terminal 110.

In response to the detection of the downlink beam failure event, the mobile terminal 110 transmits (S02-FIG. 2) the beam failure recovery signal to the base station 160. Notably, the beam failure recovery signal is using the dedicated uplink radio resources which were allocated beforehand. As already mentioned before, due to the fact that dedicated uplink radio resources are used, the base station 160 can immediately identify (recognize) and initiate the associated functionality (i.e., initiate the beam failure recovery procedure).

In case the number of uplink beams is larger than one that form the subset on which the failure recovery signal is transmitted, then the mobile terminal 110 may also transmit this signal in a beam sweeping manner. This is however, due to the restriction to a subset of all possibly available uplink beams, more efficient than a beam failure recovery signal which is transmitted in a full (not only part) beam sweeping manner.

Most importantly, the allocation of the dedicated uplink radio resources is restricting the transmission to a subset of the plurality of potentially available uplink beams. This restriction to the subset of uplink beams is enforced irrespective of whether the dedicated uplink radio resources are exclusively allocated or non-exclusively allocated by the base station 160 to the mobile terminal 110. The dedicated uplink radio resources may be restricted to the subset, for example to one, two or three uplink beams out of the maximum number of, say ten, potentially available uplink beams.

Having received the beam failure recovery signal, this however does not (yet) put the base station 160 in a position that it can complete the beam failure recovery procedure for the downlink beam for which the mobile terminal 110 has detected the beam failure. As discussed before, the beam failure recovery procedure also includes transmitting a message which allows explicitly or implicitly indicating by the mobile terminal 110 to the base station 160 alternative (candidate) downlink beams with which the beam failure can be recovered.

For this purpose, the base station 160 transmits (S03-FIG. 2) a beam failure recovery control signal to the mobile terminal 110. Most likely this control signal includes an uplink grant such that the mobile terminal 110 can effect the transmission of the alternative (candidate) downlink beams. This control signal is however not restricted to the uplink grant only.

In addition, this control signal may also include an instruction from the base station 160 that for the purposes of the beam failure recovery procedure, the mobile terminal 110 shall include its identification (e.g., a radio network terminal identifier, RNTI) in subsequent messages of the beam failure recovery procedure. This can be particularly advantageous, in case the mobile terminal 110 is not exclusively but instead non-exclusively allocated the dedicated uplink radio resources, which is however discussed further below.

With reference to the received uplink grant, the mobile terminal 110 transmits (S04-FIG. 2) a beam failure recovery request to the base station 160. This request includes at least one of the following: an explicit or implicit information about identifying the mobile terminal 110 and new downlink beam candidate information for the base station 160; an explicit or implicit information about identifying the mobile terminal 110 and whether or not new downlink beam candidates exist.

With this information, the base station 170 is capable of recovering from beam failure on the downlink beam, namely by for instance reverting to one of the explicitly or implicitly indicated new downlink beam candidate information. This information about new downlink candidate beams can, exemplarily, be obtained from downlink reference signals that are continuously transmitted by the base station 160 on all potentially available downlink beams. By measuring these downlink reference signals, the mobile terminal 110 can identify new downlink beam candidates.

In response to the beam failure recovery request, the base station 160 transmits (S05-FIG. 2) a beam failure recovery response to the mobile terminal 110. This response is a response to the beam failure recovery request transmitted by the mobile terminal 110 before. In particular, only after this response is received by the mobile terminal 110, it knows that the information indicating new downlink beam candidates has been successfully received, and has been put into practice.

Notably, a successful beam failure recovery is also possible when the beam failure recovery request, transmitted by the mobile terminal 110 to the base station 160170 does not include any new downlink beam candidate information for the base station 160 (instead the request includes the information that no new downlink beam candidates exist), In this case, the new downlink (serving) beam is then determined by the base station 160 iself170.

In particular, when the mobile terminal 110 has not suggested any new downlink beam candidate, the base station 160 may instead determine to which downlink beam it is to recover its communication with the mobile terminal 110. For this, the base station may refer to reports on the measurements of downlink reference signals (in 3GPP NR terminology e.g., CSI-RS) it has (previously) obtained from the mobile terminal 110.

Having determined a new downlink beam, the base station 160 still has to inform the mobile station 110 on the new downlink beam. Only then can both the base station 160 and the mobile terminal 110 revert to the same new pair of the new downlink and the current uplink (serving) beams. Accordingly, after determination of a new downlink beam, the base station 160 includes information on this new downlink beam also in the beam failure recovery response to the mobile terminal 110.

For example, the beam failure recovery response from the base station 160 may mark the point in time when the mobile terminal 110 switches the communication over to new beam pair including the new downlink beam as new downlink (serving) beam. In a further example, the absence of the beam failure response from the base station 160 within a given time period may result in the mobile terminal 110 determining that the beam failure recovery procedure has not been successful, thus, signaling a radio link failure event to upper layers.

In summary, a description of a 4-step beam failure recovery procedure is given in connection with the FIG. 2, namely where the steps S02, S03, S04 and S05 of the figure resemble the individual 4-steps of the procedure. In other words, the step S01 of the figure is moreover preparatory nature and, for this purpose is not considered part of the 4-step beam failure recovery procedure.

Independent of this complete presentation of the beam failure recovery procedure, it shall again be emphasized that the present disclosure is focused on proposing a robust and efficient mechanism for initiating (not concluding) the beam failure recovery procedure. Due to this narrow focus, the steps S03, S04 and S05 of the figure must be considered optional for attaining this effect. The initiation of the beam failure recovery procedure does not become more robust or efficient, if the procedure completes successful or not, there is simply no connection to the focus which is laid out herein.

Exclusive and Non-Exclusive Allocation

As mentioned before, the base station 160 can allocate dedicated uplink radio resources to the mobile terminal 110 in an exclusive or a non-exclusive manner. Even though this appears to be a small detail, it has a major impact on the beam failure recovery procedure as shall become apparent from the following.

Considering an exclusive allocation, the base station 160, after receipt of the beam failure recovery signal in S02-FIG. 2, knows exactly to which mobile terminal it has to address the control signal in S03-FIG. 2. Due to the fact that the dedicated uplink radio resources are exclusively allocated to only one mobile terminal 110, the base station 160 can derive from the dedicated uplink radio resources the mobile terminal 110 which has been using same. Consequently, the base station 160 can address the subsequent control signal 110 also to this mobile terminal 110.

Considering a non-exclusive allocation, the base station 160, after receipt of the beam failure recovery signal in S02-FIG. 2 does not know (as such) to which mobile terminal it has to address the control signal in S03-FIG. 2. For this purpose, it is suggested that base station 160 examines the context under which the beam failure recovery signal is received, and tries to infer which mobile terminal it has received the signal from. As becomes immediately apparent, if the dedicated uplink radio resources were allocated albeit non-exclusively to only a small number of, say two, mobile terminals, then the context gives more easily away from which mobile terminal the signal was received.

One possibility ties in with the fact that only a subset of the plurality of all potentially available number of uplink beams is allocated to a base station as dedicated uplink radio resources for the beam failure recovery signal. For example, if say one uplink beams is allocated as the subset to each of, say two mobile terminals in a non-exclusive manner, then this subset reduces the number of mobile terminals from which the signal can originate.

Nevertheless, for this possibility, the base station still has to predict based on the context, for example, based on most recent beam status updates, which mobile terminal from among the reduced number of mobile terminals, has used the non-exclusively allocated dedicated uplink radio resources, and has thereon (actually) transmitted the beam failure recovery signal. Already here, it shall be appreciated that the subset again enables the base station to better identify the mobile terminal from which the signal originates.

Given the case that the base station cannot or fails to predict (with a reasonable degree of certainty) from which mobile terminal the signal originates, it can decide to transmit the beam failure recovery control signal of S02-FIG. 2 to more than one, in the above example to the two, mobile terminals which have both been non-exclusively allocated the same dedicated uplink radio resources.

In this case, it is advantageous as discussed before, if the mobile terminal is instructed to include its identification in the subsequent messages, namely in the beam failure recovery request, i.e., of S04-FIG. 2. From this included identification information in the beam failure recovery request, the base station can conclude on the correct mobile terminal for which the beam failure recovery procedure shall be carried out. For the other incorrectly predicted mobile terminal it will stop the beam failure recover procedure.

Another possibility ties in with the fact that the beam failure recovery signal may be transmitted on a dedicated uplink radio resource which itself requires additional control information to be appended. This appended control information may be used by the base station to identify the mobile terminal as the origin of the signal.

This is for example the case where the beam failure recovery signal is transmitted via a physical uplink control channel, PUCCH. The 3GPP NR specification of the PUCCH prescribes the mobile terminal not only to transmit uplink control information, UCI, of a given format, but also to append thereto transmission demodulation reference signals, DM-RS, which are uniquely assigned to each mobile terminal.

Thus, having received a beam failure recovery signal in an UCI on the PUCCH, the base station can identify from the DM-RS the mobile terminal that has transmitted this signal. Also here the context is decisive for the base station to identify the mobile terminal in order to address the subsequent beam failure recovery control signal in S03-FIG. 2 to the correct mobile terminal.

Figure 3:
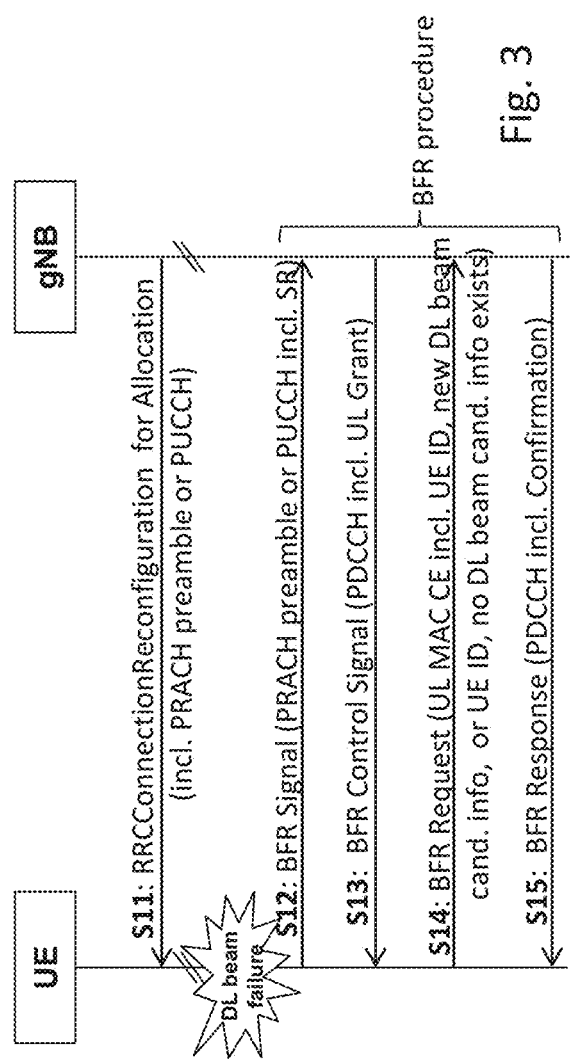
FIG. 3 is schematic drawings illustrating a beam failure recovery procedure initiation in the context of a 4-step beam failure recovery procedure in a 3GPP NR deployment scenario.

FIG. 3 now assumes a 3GPP NR deployment scenario. In more detail, this figure depicts the initiation of beam failure recovery procedure in the context of a 4-step beam failure recovery procedure, where the UE and the gNB communicate over a pair of downlink and uplink beams. Also here a pair of downlink and uplink (serving) beams are one of a plurality of downlink beams and one of a pair of uplink beams that can be configured by the gNB in the UE.

For the beam failure recovery procedure, the UE is allocated (S11-FIG. 3) by the gNB with dedicated uplink radio resources. As mentioned earlier, the allocation of uplink radio resources is dedicated for the use with beam failure recovery signaling. For this purpose, the gNB transmits a radio resource configuration, RRC; connection reconfiguration message to the UE. Alternatively, also an RRC connection setup message may be used for allocation purposes.

In another example, the UE is allocated with dedicated uplink radio resources via a downlink medium access control, MAC, control element, CE, a downlink control information, DCI, and a control protocol data unit, PDU of a packet data convergence protocol, PDCP. In particular, the PDCP control PDU has even the advantage that the signaling overhead is slightly less when compared to a RRC connection reconfiguration message. Thus, this can result in a further increase in signaling speed.

Separate from an allocation through a single message, the allocation can also be achieved by a first message configuring the dedicated uplink radio resources, and a second, subsequent message activating the configuration. In this case, the UE receives from the gNB a configuration of the dedicated uplink radio resources via an RRC connection setup or reconfiguration message, and (subsequently) an activation of the dedicated uplink radio resources from the configuration via one of MAC CE, a DCI, and a PDCP control PDU.

This message may include a reference to a dedicated uplink radio resource of a physical random access channel, PRACH, namely one of a contention-free resource, preferably a contention-free preamble sequence with a time and frequency reference on an uplink beam.

Reference is made to contention-free preamble sequences only. This is due to the fact that in 3GPP NR the gNB only (actively) assigns these types of preamble sequence to an UE. In contrast, for non-contention free (contention-based) preamble sequences, the gNB cannot distinguish whether these sequences are being used by an UE for initiation of the beam failure recovery procedure, or whether a (conventional) time-alignment procedure is being carried out. This rules out any usage of the non-contention free (contention-based) preamble sequences as dedicated uplink radio resources for the initiation of the beam failure recovery procedure.

Assuming, for example, the configuration shown in FIG. 5, the message may include a reference to a PRACH with a preamble sequence index S1, a time reference T1, and a frequency reference F1 on uplink beam #1. Thereby, the UE is allocated with a dedicated uplink radio resource with which it can initiate the beam failure recovery procedure. In this example, the time reference T1 may be understood as an offset indicating a slot which is offset in time from each radio frame boundary. Additionally, the frequency reference F1 may be understood as an index of a resource block.

Alternatively this message may also include a reference to a dedicated uplink radio resource of a physical uplink control channel, PUCCH, namely to a contention-free uplink control information, UCI, of a given format with a time and frequency reference on an uplink beam. Assuming, for example, the configuration shown in FIG. 6, the message may include a reference to a PUCCH with a time reference T1 and a frequency reference F1 on beam #1.

In both examples, namely the contention-free PRACH or PUCCH, the dedication of the uplink radio resources can prevent it from being used in a different context. In any case, the dedication of the uplink radio resource enables the gNB to identify (recognize) and initiate the associated functionality (i.e., initiate the beam failure recovery procedure) when receiving the beam failure recovery signaling on the dedicated uplink radio resource.

In response to the detection of the beam failure event, the UE transmits (S12-FIG. 3) the beam failure recovery signal to the gNB. Notably, the beam failure recovery signal is using the dedicated uplink radio resources namely the contention-free PRACH or PUCCH, which were allocated beforehand. As already mentioned before, due to the fact that dedicated uplink radio resources are used, the gNB can immediately identify (recognize) and initiate the associated functionality (i.e., initiate the beam failure recovery procedure). Notably, the PRACH resource implicitly indicates a scheduling request, SR, whereas the UCI of the given format may explicitly or implicitly include the SR.

Having received the dedicate PRACH or PUCCH resources, the gNB initiates the beam failure recovery procedure. As part of this procedure, the gNB transmits (S13-FIG. 3) a physical downlink control channel, PDCCH, downlink control information, DCI, with an uplink grant. DCIs on the PDCCH also include a cyclic redundancy check, CRC field which is scrambled with a radio network temporary identifier, RNTI, of the UE. Thereby, the UE can detect, whether or not the gNB has intended the DCI for the UE to be used in the beam failure recovery procedure.

Assuming the UE has received an uplink grant, the mobile terminal 110 transmits (S14-FIG. 3) in form of an uplink MAC control element a beam failure recover request to the gNB. This request includes at least one of the following: an explicit or implicit information about identifying the UE and new downlink beam candidate information for the gNB; an explicit or implicit information about identifying the UE and whether or not new downlink beam candidates exist.

Finally, in response to the beam failure recovery request, the gNB transmits (S15-FIG. 3) a beam failure recovery response to the UE in form of a PDCCH DCI including a confirmation, for example, an acknowledgement. This response is a response to the beam failure recovery request transmitted by the UE before. In particular, only after this response has been received by the UE, it knows that the information indicating new downlink beam candidates has been successfully received, and has been put into practice.

Alternatively, when the mobile terminal has not suggested any new downlink beam candidate, the gNB may include information on the new downlink beam in the beam failure recovery response to the UE. Depending on the number of potentially available downlink beam, this information may still be accommodated in a response in form of a PDCCH DCI. Also then can both the gNB and the UE revert to the same pair of the new downlink and the current uplink (serving) beam, thereby successfully completing the beam failure recovery procedure.

Figure 4:
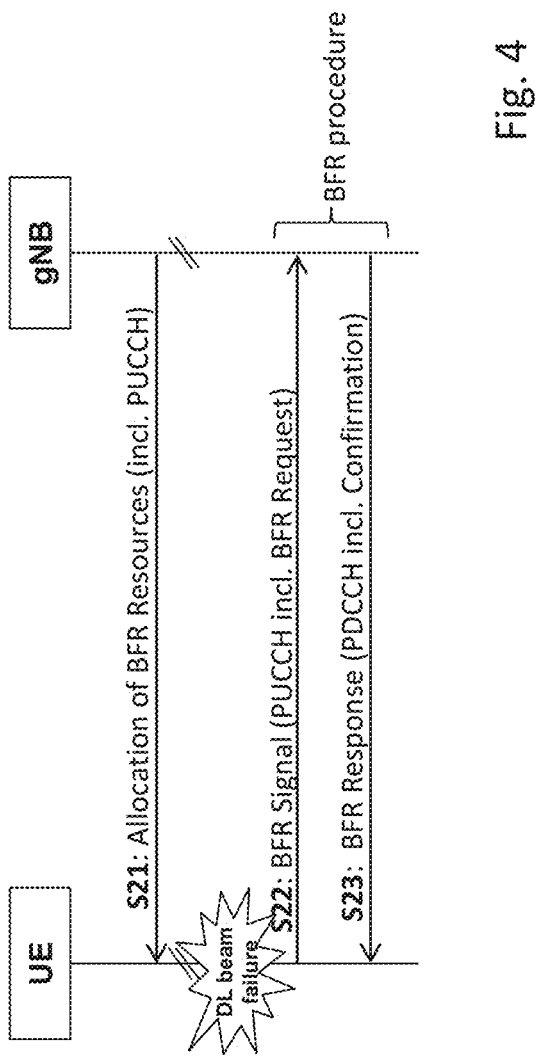
FIG. 4 is schematic drawings illustrating a beam failure recovery procedure initiation in the context of a 2-step beam failure recovery procedure in a 3GPP NR deployment scenario.

FIG. 4 now assumes another 3GPP NR deployment scenario. In more detail, this figure depicts the initiation of beam failure recovery procedure in the context of a 2-step beam failure recovery procedure, where the UE and the gNB communicate over a pair of downlink and uplink (serving) beams. Also here downlink and uplink (serving) beams are one of a plurality of downlink beams and one of a pair of uplink beams that can be configured by the gNB to the UE. Notably, the 2-step beam failure recovery procedure is restricted to dedicated uplink radio resources from the physical uplink control channel, PUCCH only.

This procedure is very similar to the 4-step beam failure recovery procedure shown in the previous figure. The transmissions between the UE and the gNB for the allocation of the dedicated uplink resources (S21-FIG. 4) and the transmission of the beam failure recovery response (S23-FIG. 4) correspond to the respective steps in the previous procedure. Moreover, the only difference resides in the format of the beam failure recovery signal (S22-FIG. 4).

Here, use is made of the fact that an uplink control information, UCI, on the PUCCH depending on the given format can include a sufficient number of bits, for example 1 or 2 bits in PUCCH format 1a/1b, 20 coded bits in PUCCH format 2/2a/2b, or even 48 coded bits in PUCCH format 3.

Thus, it is suggested in this example that the UE transmits as beam failure recovery signal to the gNB not only an UCI of PUCCH, which resembles a dedicated uplink radio resource, but also carries the information of the beam failure recovery request, namely at least one of the following: an explicit or implicit information about identifying the UE and new downlink beam candidate information for the gNB; an explicit or implicit information about identifying the UE and whether or not new downlink beam candidates exist.

Robust Allocation Mechanism

As discussed before, the present disclosure focuses on a robust mechanism that enables the base station to respond to the detection of a downlink beam failure event while reducing the amount of uplink radio resources that are blocked (assigned) for initiating the beam failure recovery procedure. The reduction of the amount of uplink radio resources, however, requires the base station, in one example, to carefully select the dedicated uplink radio resources to be assigned.

For this purpose, the base station may determine the subset from among all potentially available uplink beams based on most recent quality and/or power measurements. In this context, it may be advantageous to revert to reference signals that are signaled either on all potentially available downlink beams or the uplink beams. From this, the base station can then select the subset with reference to the measured quality and/or power values.

Assuming an 3GPP NR deployment scenario, the base station may revert, for the determination of the subset of uplink beams, to all potentially available uplink reference signals, preferably sounding reference signals, SRS that are transmitted by mobile terminals on all potentially available or at least on the most relevant uplink beams.

The base station may also revert, for this determination of the subset of uplink beams, to reports, preferably to channel status information, CSI, reports that are drawn up by a mobile terminal on measurements of downlink reference signals, preferably, CSI-RS, having been transmitted by the base station on all potentially available downlink beams.

Either way, it can be ensured that the subset of the uplink resources fits the purpose of allowing the mobile terminal to robustly respond to the detection of a downlink beam failure event, namely without risking that the beam failure recovery signal cannot be received by the base station.

Mobility State

In an exemplary implementation, the focus laid on an efficient mechanism for allocating the dedicated uplink radio resources on the subset of uplink beams. To achieve this, the base station varies the number of uplink beams that form the subset on which dedicated uplink radio resources are allocated to the mobile terminal. Particularly, by varying the number of uplink beams, the base station strives to account for varying (actual) situations (e.g., low or high number of position changes) in the mobile terminal.

As seen from the discussion above, one of the main causes of beam failures is the mobility (i.e., varying spatial position) of the mobile terminal. Should the mobile terminal change its position at a high rate, it is difficult to predict for the bases station which the most pertinent dedicated uplink radio resource will be, should there occur a downlink beam failure. In other words, a highly changing position of mobile terminals makes it difficult for the base station to allocate dedicated uplink radio resources on a subset of uplink beams which still meet the requirements of a reliable beam failure recovery procedure.

With these difficulties in mind, the present disclosure proposes the base station to maintain a mobility state for each mobile terminal. The mobility state distinguishes, for each mobile terminal between a low number and a high number of positional changes in a given time period. In other words, based on the mobility state, the base station can ascertain for each mobile terminal if positional changes have occurred (in the past) at a low rate or a high rate.

This mobility state is then used by the base station to predict the number of uplink beams in the subset to ensure a reliable beam failure recover procedure. Thus, the number of uplink beams forming the subset of all potentially available uplink beams may be determined by the base station corresponding to the mobility state of the respective mobile terminal.

In one example, namely for a mobile terminal with a mobility state corresponding to a low positional change rate, the base station may validly predict that the mobile terminal's position will also not often change in the future, hence, the it suffices to allocate dedicated uplink radio resources on a low number of uplink beams (for example one or two uplink beams). In a different example, namely for a mobile terminal with a mobility state corresponding to a high positional change rate, the base station may, in contrast, validly predict that the mobile terminal's position will also often change in the future, hence it becomes necessary to allocate dedicated uplink radio resources on a high number of uplink beams (for example three or more).

Exemplarily, the mobility state, thus the positional change rate, can be determined by both the base station and the mobile terminal based on the number of reconfiguration commands for the downlink beam (beemsteering) that are transmitted from the base station to the mobile terminal. Despite the fact that the reconfiguration of the downlink beam is effected at the base station, the mobile terminal will take account thereof in form of a reconfiguration command, namely which instructs the mobile terminal to reconfigure its beam pair to include a new downlink beam.

Also exemplarily, the mobility state, thus the positional change rate, can be determined based on the number positional changes, which is preferably determined from positioning measurements in the mobile terminal for a given time period and then signaled to the base station. In other words, the mobile terminal itself determines its positional change rate, for instance by performing positioning measurements including checking for new downlink beams, and then signals same to the base station.

In both cases, the mobility state facilitates the selection of a sufficient number of uplink beams for the mobile terminal to robustly respond to the detection of a downlink beam failure event, namely without risking that the beam failure recovery signal cannot be received by the base station.

Up-to-Datedness of Allocation

In another exemplary implementation, the focus is again laid on an efficient mechanism for allocating the dedicated uplink radio resources on the subset of uplink radio beams. To achieve this, each allocation of dedicated uplink radio resources to a mobile terminal has an expiration time. Thereby, the up-to-datedness of allocations of dedicated uplink radio resources can be ensured, as well as the fact that the resources are only blocked for a limited amount of time.

As apparent from the discussion above, the base station allocating dedicated uplink radio resources to a mobile station cannot always cope with varying (actual) situations (e.g., position changes) in the mobile terminal. An allocation on one subset of uplink beams may be valid for a mobile terminal in one position, however not for the same mobile terminal after moving to another position.

Thus, the present disclosure proposes that each allocation is valid for a given (short) period of time, and exceptionally only until a new (re-)allocation is received. In other words, irrespective of whether the mobile station receives from the base station an exclusive or non-exclusive allocation of dedicated uplink resources for the beam failure recovery procedure, these resources are only blocked for a limited amount of time.

This can be ensured by base station 160 when transmitting (cf. S01-FIG. 2) the allocation to the mobile station 110, also indicating a time period for which dedicated uplink radio resources are valid. For example, together with the allocation of the dedicated uplink radio resources, both the base station and the mobile terminal can initiate a countdown timer. Once this timer has expired, the base station as well as the mobile terminal knows that the dedicated uplink radio resources can no longer be used, are hence not blocked anymore.

However, to avoid cases no or only an expired allocation, the mobile terminal may transmit to the base station an indication for the base station to (re-)initiate allocation of dedicated uplink radio resources for the beam failure recovery procedure.

Assuming an NR deployment scenario, the indication for (re-)initiate allocation of the dedicated uplink radio resources is (implicit) a channel status information, CSI, report, signaling a quality or power of the serving downlink beam below a given threshold value, or a dedicated transmission, preferably in form of either a RRC message, or an uplink MAC CE, signaling an explicit request for (re-)initiating allocation of the dedicated uplink radio resources.

In summary, the expiration of an allocation of dedicated uplink radio resources further improves the efficient usage of same resources. Not only does the expiration of an allocation of resources facilitates an up-to-datedness which is anyway necessary for the allocation to reflect the actual (current) situation of the mobile station, it also prevents from an blockage of resources, which is particular advantageous for the case where same resources are allocated in an exclusive manner.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is suggested for communicating in a mobile communication system with a base station using at least one of a plurality of downlink beams and at least one of a plurality of uplink beams, each of the downlink and uplink beams having different directivities and/or coverage, comprising: which, in operation, receives for a beam failure recovery, BFR, procedure an allocation of dedicated uplink radio resources for transmitting a beam failure recovery signal, a processor which, in operation, detects a downlink beam failure event and, in response thereto, initiates the beam failure recovery procedure, including the transceiver transmitting the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

According to a second aspect, which can be combined with the first aspect, the subset of the plurality of the uplink beams is exclusively allocated to the mobile terminal based on: uplink reference signals, preferably sounding reference signals, SRS, transmitted by the mobile terminal on the plurality of uplink beams, or a report, preferably a channel status information, CSI, report, by the mobile terminal on measurements of downlink references signals, preferably CSI-RSs, transmitted by the base station on the plurality of downlink beams.

According to a third aspect, which can be combined with the first or second aspect, the number of uplink beams forming the subset of the plurality of uplink beams corresponds to one, two or three uplink beams.

According to a fourth aspect, which can be combined with one of the first to third aspects, the number of uplink beams forming the subset of the plurality of uplink beams corresponds to a mobility state of the mobile terminal that distinguishes between a low and a high rate of positional changes of the mobile terminal.

According to a fifth aspect, which can be combined with the fourth aspect, the mobility state of the mobile terminal is determined based on, the number of reconfiguration commands for the downlink beam that are transmitted by the base station to the mobile terminal for a time period, or the number positional changes, preferably determined from positioning measurements, in the mobile terminals for a time period and signaled to the base station.

According to a sixth aspect, which can be combined with one of the first to fifth aspect, the transceiver, in operation, additionally receives for the beam failure recovery procedure an indication indicating the number of uplink beams in the subset of the plurality of uplink beams that is to be used in the beam failure recovery procedure.

According to a seventh aspect, which can be combined with one of the first to sixth aspect, the indication indicating the number of uplink beams in the subset of the plurality of uplink beams is to be used is received in: an radio resource configuration, RRC, message, or a medium access control, MAC, control element, CE, or a downlink control information, DCI.

According to a eighth aspect, another mobile terminal is proposed for communicating in a mobile communication system with a base station using at least one of a plurality of downlink beams and at least one of a plurality of uplink beams, each of the downlink and uplink beams having different directivities, comprising: which, in operation, receives for a beam failure recovery, BFR, procedure an allocation of dedicated uplink radio resources for transmitting a beam failure recovery signal, a processor which, in operation, detects a downlink beam failure event and, in response thereto, initiates the beam failure recovery procedure, including the transceiver transmitting the beam failure recovery signal using the dedicated uplink radio resources of the previous allocation; wherein the dedicated uplink radio resources are restricting the transmission to a subset of the plurality of uplink beams that can be non-exclusively allocated by the base station to the mobile terminal.

According to a ninth aspect, which can be combined with the eighth aspect, the transmission on the subset of the plurality of uplink beams, to which the beam failure recovery signal on the dedicated uplink radio resources is restricted, enables the base station to identify the mobile terminal.

According to a tenth aspect, which can be combined with the eighth or ninth aspect, in case the dedicated uplink radio resources include a physical uplink control channel, PUCCH, the transmission of demodulation reference signals, DM-RS together with the beam failure recovery signal in the PUCCH enables the base station to identify the mobile terminal.

According to an eleventh aspect, which can be combined with one of the eighth to tenth aspect, the allocation of dedicated uplink radio resources includes an instruction for the mobile terminal to include its identification in subsequent messages of the beam failure recovery procedure.

According to a twelfth aspect, which can be combined with one of the first to eleventh aspect, the dedicated uplink radio resources correspond to one of: a contention-free resource, preferably a contention-free preamble sequence with a time and frequency reference, of a physical random access channel, PRACH, and a contention-free resource, preferably uplink control information, UCI with a time and frequency reference, of a physical uplink control channel, PUCCH.

According to a thirteenth aspect, which can be combined with one of the first to twelfth aspect, the allocation of the dedicated uplink radio resources is received via one of: a radio resource configuration, RRC, connection reconfiguration or RRC connection setup message, a downlink medium access control, MAC, control element, CE, a downlink control information, DCI, and a control protocol data unit, PDU of a packet data convergence protocol, PDCP.

According to a fourteenth aspect, which can be combined with one of the first to twelfth aspect, the allocation of the dedicated uplink radio resource includes that the transceiver, in operation, receives: a configuration of the dedicated uplink radio resource via an RRC connection setup or reconfiguration message, and an activation for the dedicated uplink radio resources from the configuration via one of MAC CE, a DCI, and a PDCP control PDU.

According to a fifteenth aspect, which can be combined with one of the first to fourteenth aspect, the allocation of dedicated uplink resources is valid either for a time period, or until a new allocation is received.

According to a sixteenth aspect, which can be combined with one of the fifteenth aspect, the time period for which the allocation of dedicated uplink resources is valid is indicated in the allocation.

According to a seventeenth aspect, which can be combined with one of the first to sixteenth aspect, the transceiver, in operation, transmits an indication for the base station to (re-)initiate allocation of dedicated uplink radio resources for the beam failure recovery procedure.

According to a eighteenth aspect, which can be combined with the seventeenth aspect, the indication for (re-)initiating allocation of the dedicated uplink radio resources is: a channel status information, CSI, report, signaling a quality or power of the serving downlink beam below a threshold value, or a dedicated transmission, preferably in form of either a RRC message, or an uplink MAC CE, signaling an explicit request for (re-) initiating allocation of the dedicated uplink radio resources.

According to a nineteenth aspect, a method for initiating a beam failure recovery procedure is suggested to be performed by a mobile terminal configured to communicate in a mobile communication system with a base station using at least one of a plurality of downlink beams and at least one of a plurality of uplink beams, each of the downlink and uplink beams having different directivities and/or coverage, the method comprising the steps of: for a beam failure recovery, BFR, procedure an allocation of dedicated uplink radio resources for transmitting a beam failure recovery signal, detecting a downlink beam failure event and, in response thereto, initiating the beam failure recovery procedure, including transmitting the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

According to a twentieth aspect, which can be combined with the nineteenth aspect, the subset of the plurality of the uplink beams is exclusively allocated to the mobile terminal based on: uplink reference signals, preferably sounding reference signals, SRS, transmitted by the mobile terminal on the plurality of uplink beams, or a report, preferably a channel status information, CSI, report, by the mobile terminal on measurements of downlink references signals, preferably CSI-RSs, transmitted by the base station on the plurality of downlink beams.

According to a twenty-first aspect, which can be combined with the nineteenth or twentieth aspect, the number of uplink beams forming the subset of the plurality of uplink beams corresponds to one, two or three uplink beams.

According to a twenty-second aspect, which can be combined with one of the nineteenth to twenty first aspect, the number of uplink beams forming the subset of the plurality of uplink beams corresponds to a mobility state of the mobile terminal that distinguishes between a low and a high rate of positional changes of the mobile terminal.

According to a twenty-third aspect, which can be combined with one of the nineteenth to twenty second aspect, the mobility state of the mobile terminal is determined based on, the number of reconfiguration commands for the downlink beam that are transmitted by the base station to the mobile terminal for a time period, or the number positional changes, preferably determined from positioning measurements, in the mobile terminals for a time period and signaled to the base station.

According to a twenty-fourth aspect, which can be combined with one of the nineteenth to twenty third aspect, the method comprises the step of: additionally receiving for the beam failure recovery procedure an indication indicating the number of uplink beams in the subset of the plurality of uplink beams that is to be used in the beam failure recovery procedure.

According to a twenty-fifth aspect, which can be combined with twenty fourth aspect, the indication indicating the number of uplink beams in the subset of the plurality of uplink beams is to be used is received in: an radio resource configuration, RRC, message, or a medium access control, MAC, control element, CE, or a downlink control information, DCI.

According to a twenty-sixth aspect, another method for initiating a beam failure recovery procedure is suggested to be performed by a mobile terminal configured to communicate with a base station using at least one of a plurality of downlink beams and at least one of a plurality of uplink beams, each of the uplink and downlink beams having different directivities, comprising: receiving for a beam failure recovery, BFR, procedure an allocation of dedicated uplink radio resources for a beam failure recovery signal, detecting a downlink beam failure event and, in response thereto, initiating the beam failure recovery procedure, including transmitting the beam failure recovery signal using the dedicated uplink radio resources of the previous allocation; wherein the dedicated uplink radio resources are restricting the transmission to a subset of the plurality of uplink beams that can be non-exclusively allocated by the base station to the mobile terminal.

According to a twenty-seventh aspect, which can be combined with the twenty sixth aspect, the transmission on the subset of the plurality of uplink beams, to which the beam failure recovery signal on the dedicated uplink radio resources is restricted, enables the base station to identify the mobile terminal.

According to a twenty-eighth aspect, which can be combined with the twenty sixth or twenty seventh aspect, in case the dedicated uplink radio resources include a physical uplink control channel, PUCCH, the transmission of demodulation reference signals, DM-RS together with the beam failure recovery signal in the PUCCH enables the base station to identify the mobile terminal.

According to a twenty-ninth aspect, which can be combined with one of the twenty sixth to twenty eighth aspect, the allocation of dedicated uplink radio resources includes an instruction for the mobile terminal to include its identification in subsequent messages of the beam failure recovery procedure.

According to a thirtieth aspect which can be combined with one of the nineteenth to twenty ninth aspect, the dedicated uplink radio resources correspond to one of: a contention-free resource, preferably uplink control information, UCI with a time and frequency reference, of a physical uplink control channel, PUCCH.

According to a thirty-first aspect, which can be combined with one of the nineteenth to thirtieth aspect, the allocation of the dedicated uplink radio resources is received via one of: a radio resource configuration, RRC, connection reconfiguration or RRC connection setup message, downlink medium access control, MAC, control element, CE, a downlink control information, DCI, and a control protocol data unit, PDU, of a packet data convergence protocol, PDCP.

According to a thirty-second aspect, which can be combined with one of the nineteenth to thirtieth aspect, the allocation of the dedicated uplink radio resource includes receiving: a configuration of the dedicated uplink radio resource via an RRC connection establishment or reconfiguration message, and an activation for the dedicated uplink radio resources from the configuration via one of MAC CE, a DCI, and a PDCP control PDU.

According to the thirty-third aspect, which can be combined with one of the nineteenth to thirty second aspect, the allocation of dedicated uplink resources is valid either for a time period, or until a new allocation is received.

According to the thirty-fourth aspect, which can be combined with the thirty third aspect, the time period for which the allocation of dedicated uplink resources is valid is indicated in the allocation.

According to the thirty-fifth aspect, which can be combined with one of the nineteenth to thirty-fourth aspect, the method comprises the step of: transmitting an indication for the base station to (re-)initiate allocation of dedicated uplink radio resources for the beam failure recovery procedure.

According to the thirty-sixth aspect, which can be combined with the thirty fifth aspect, the indication for (re-)initiating allocation of the dedicated uplink radio resources is: a channel status information, CSI, report, signaling a quality or power of the serving downlink beam below a threshold value, or a dedicated transmission, preferably in form of either a RRC message, or an uplink MAC CE, signaling an explicit request for (re-) initiating allocation of the dedicated uplink radio resources.

According to the thirty-seventh aspect, a base station is suggested for communicating in a mobile communication system with a mobile terminal using at least one of a plurality of downlink beams and at least one of a plurality of uplink beams, each of the downlink and uplink beams having different directivities and/or coverage, comprising: a processor which, in operation, performs the beam failure recovery procedure, including the transceiver receiving from the mobile terminal the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

According to a thirty-eighth aspect, another base station is proposed for communicating in a mobile communication system with a mobile terminal using at least one of a plurality of downlink beams and at least one of a plurality of uplink beams, each of the downlink and uplink beams having different directivities and/or coverage, comprising: a processor which, in operation, imitates the beam failure recovery procedure, including the transceiver receiving from the mobile terminal the beam failure recovery signal using the dedicated uplink radio resources from the allocation; wherein the dedicated uplink radio resources are restricting the transmission to a subset of the plurality of uplink beams that can be non-exclusively allocated by the base station to the mobile terminal.

According to a thirty-ninth aspect, a method for initiating a beam failure recovery procedure is suggested to be performed by a base station configured to communicate in a mobile communication system with a mobile terminal using at least one of a plurality of downlink beams and at least one of a plurality of uplink beams, each of the downlink and uplink beams having different directivities and/or coverage, the method comprising the steps of: initiating the beam failure recovery procedure, in response to receiving from the mobile terminal the beam failure recovery signal using the dedicated uplink radio resources from the allocation; wherein the dedicated uplink radio resources are restricting the transmission to a subset of the plurality of uplink beams that can be exclusively allocated by the base station to the mobile terminal.

According to a fortieth aspect, another method for initiating a beam failure recovery procedure is proposed to be performed by a base station configured to communicate in a mobile communication system with a mobile terminal using at least one of a plurality of downlink beams and at least one of a plurality of uplink beams, each of the downlink and uplink beams having different directivities and/or coverage, the method comprising the steps of: initiating the beam failure recovery procedure, in response to receiving from the mobile terminal the beam failure recovery signal using the dedicated uplink radio resources from the allocation; wherein the dedicated uplink radio resources are restricting the transmission to a subset of the plurality of uplink beams that can be non-exclusively allocated by the base station to the mobile terminal.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
    a transceiver which, in operation, receives, from a base station, a configuration of dedicated uplink radio resources; and
    a processor which, in response to detecting a downlink beam failure event, initiates a beam failure recovery (BFR) procedure including the transceiver transmitting a beam failure recovery signal using the dedicated uplink radio resources included in the configuration,
    wherein the configuration includes a timer indicating a validity time of the dedicated uplink radio resources corresponding to contention-free resources for the BFR procedure, wherein the validity time of the timer is differently defined from a time length of the dedicated uplink radio resources.

2. The user equipment according to claim 1, wherein a subset of a plurality of uplink beams is dedicatedly allocated to the user equipment based on at least one of:
    uplink reference signals (RS) or sounding reference signals (SRS) transmitted by the user equipment on the plurality of uplink beams; and
    a report or a channel status information (CSI) report, by the user equipment, on measurements of downlink references signals or CSI-RSs, transmitted by the base station on a plurality of downlink beams.

3. The user equipment according to claim 2, wherein a number of the uplink beams forming the subset corresponds to one, two or three uplink beams.

4. The user equipment according to claim 2, wherein a number of the uplink beams forming the subset corresponds to a mobility state of the user equipment that distinguishes between a low and a high rate of positional changes of the user equipment.

5. The user equipment according to claim 4, wherein the mobility state of the user equipment is determined based on at least one of:
    a number of reconfiguration commands for the downlink beam that are transmitted by the base station to the user equipment for a first time period; and
    a number of positional changes, determined from positioning measurements, in the user equipment for a second time period and signaled to the base station.

6. The user equipment according to claim 1, wherein the transceiver, in operation, additionally receives for the BFR procedure an indication indicating a number of uplink beams in a subset of a plurality of uplink beams that is to be used in the BFR procedure.

7. The user equipment according to claim 6, wherein the indication is received in at least one of:
    a radio resource configuration (RRC) message;
    a medium access control (MAC) control element (CE); and
    a downlink control information (DCI).

8. The user equipment according to claim 1,
wherein the dedicated uplink radio resources correspond to one of:
- a contention-free resource, comprising a contention-free preamble sequence with a time and frequency reference, of a physical random access channel (PRACH); and
- a contention-free resource, comprising uplink control information (UCI) with a time and frequency reference, of a physical uplink control channel (PUCCH), and/or wherein the configuration of the dedicated uplink radio resources is received via one of:
- a radio resource configuration (RRC) connection reconfiguration or RRC connection setup message;
- a downlink medium access control (MAC) control element (CE);
- a downlink control information (DCI); and
- a control protocol data unit (PDU) of a packed data convergence protocol (PDCP).

9. The user equipment according to claim 1, wherein the transceiver, in operation, receives:
the configuration of the dedicated uplink radio resources via one of a radio resource configuration (RRC) connection setup message and a RRC reconfiguration message; and
an activation for the dedicated uplink radio resources via one of a medium access control (MAC) control element (CE), a downlink control information (DCI), and a packet data convergence protocol (PDCP) control protocol data unit (PDU).

10. The user equipment according to claim 1, wherein the transceiver, in operation, transmits an indication for the base station to initiate the configuration of the dedicated uplink radio resources, wherein the indication for initiating the configuration is at least one of:
- a channel status information (CSI) report, signaling a quality or power of a serving downlink beam below a threshold value; and
- a dedicated transmission, in form of either a radio resource control (RRC) message, or an uplink medium access control (MAC) control element (CE), signaling an explicit request for initiating the configuration of the dedicated uplink radio resources.

11. The user equipment according to claim 1, wherein the dedicated uplink radio resources restrict transmission from the user equipment to a subset of a plurality of uplink beams that can be dedicatedly allocated by the base station to the user equipment.

12. A method performed by a user equipment, comprising:
receiving, from a base station, a configuration of dedicated uplink radio resources; and
in response to detecting a downlink beam failure event, initiating a beam failure recovery (BFR) procedure including transmitting a beam failure recovery signal using the dedicated uplink radio resources included in the configuration,
wherein the configuration includes a timer indicating a validity time of the dedicated uplink radio resources corresponding to contention-free resources for the BFR, wherein the validity time of the timer is differently defined from a time length of the dedicated uplink radio resources.

13. The method according to claim 12, wherein the dedicated uplink radio resources restrict transmission from the user equipment to a subset of a plurality of uplink beams that can be dedicatedly allocated by the base station to the user equipment.

* * * * *